(12) United States Patent
Wierenga

(10) Patent No.: US 6,552,985 B1
(45) Date of Patent: Apr. 22, 2003

(54) METHOD OF RECORDING A MULTI-LAYER OPTICALLY RECORDABLE INFORMATION CARRIER

(75) Inventor: Harm A. Wierenga, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/433,508

(22) Filed: Nov. 3, 1999

(30) Foreign Application Priority Data

Nov. 9, 1998 (EP) .............................. 98203756

(51) Int. Cl.⁷ ................................. G11B 7/00
(52) U.S. Cl. ..................... 369/53.22; 369/53.2; 369/94; 369/275.4; 369/284
(58) Field of Search ................ 369/47.51, 53.14, 369/53.2, 53.22, 53.31, 53.33, 53.36, 94, 283, 284, 275.1–275.4; 347/258

(56) References Cited

U.S. PATENT DOCUMENTS

| | | | | |
|---|---|---|---|---|
| 5,202,875 A | * | 4/1993 | Rosen et al. | 369/94 |
| 5,414,451 A | * | 5/1995 | Sugiyama et al. | |
| 5,485,452 A | * | 1/1996 | Maeda | 369/284 |
| 5,761,188 A | * | 6/1998 | Rosen et al. | 369/275.2 |

* cited by examiner

*Primary Examiner*—W. R. Young
(74) *Attorney, Agent, or Firm*—Michael E. Belk

(57) ABSTRACT

A circuit derives information about the changes of the transmission coefficients of the layers due to writing information onto these layers. On the basis of the derived information a circuit determines the sequence in which the layers are to be recorded so as to minimize the required intensity of the laser beam, thereby precluding unnecessary heating of the carrier and allowing comparatively simple and cheap laser beam sources to be used.

16 Claims, 3 Drawing Sheets

METHOD OF RECORDING A MULTI-LAYER OPTICALLY RECORDABLE INFORMATION CARRIER

FIELD OF THE INVENTION

The invention relates to the field of optically recordable information carriers with multiple information layers accessible from the same side of the media.

BACKGROUND OF THE INVENTION

The invention relates to a method of recording information onto an optically recordable information carrier having at least two different superposed optically recordable layers. The method includes a first step in which information is recorded on a first one of the optically recordable layers by laser light to which the information carrier is exposed from a first side. The first step is followed by a second step in which information is recorded on a second one of the optically recordable layers, light to which the information carrier is also exposed from the first side.

The invention further relates to a recording apparatus for the recording of information on an optically recordable information carrier having at least two different superposed optically recordable layers. The apparatus includes comprising a device adapted to record information on a first one of the optically recordable layers by laser light to which the information carrier is exposed from a first side. The device is also adapted and to record information on a second one of the optically recordable layers, which second layer differs from the first layer, by laser light to which the information carrier is also exposed from the first side.

Optically recordable information carriers are generally known and are used in recording apparatuses which record data on the information carrier by a laser beam. The laser beam is focused into a focal spot on a recording layer in the information carrier. In the case of an adequate laser beam intensity the optical properties of the recording layer at the location of the focal spot will change, as a result of which a mark is produced in the recording layer. By varying the laser beam intensity a pattern of marks can be formed in the recording layer. The recorded pattern contains the data to be recorded in coded form. An example of such an optically recordable information carrier is the CD-R (Compact Disc Recordable).

In order to extend the storage capacity of optically recordable information carriers information carriers have been introduced which include a plurality of superposed recording layers. Examples of such multi-layer optically recordable information carriers are described in U.S. Pat. Nos. 5,761,188 and 5,202,875. Each recording layer in a multi-layer optically recordable information carrier can be inscribed separately by focusing the laser beam onto the relevant recording layer. The recording apparatuses use a high numerical aperture (NA). Owing to this high numerical aperture, the diameter of the laser beam, at the location of the recording layers situated between the source of the laser beam (laser light source) and the recording layer to be inscribed (hereinafter referred to as the intermediate layers), is comparatively large. As a result of this, the intensity of the laser beam at the location of the intermediate layers will be inadequate intensity to produce marks on these layers, whereas producing marks on the layer to be inscribed is possible. Also at the location of each of the intermediate recording layers, having a distance between the respective layer and the laser light source which is larger than the distance between the recording layer to be inscribed and the laser light source, the intensity of the laser beam is inadequate to produce marks in these layers owing to the comparatively large diameter of the beam.

Although the intermediate layers cannot be inscribed, they have on influence on the laser beam. A part of the laser beam will be reflected, diffused and absorbed by the intermediate layers. The remainder of the laser beam, quantified by the transmission coefficient, will be transmitted by the intermediate layers. The magnitude of the transmitted part depends on the optical properties of the intermediate layers. However, the optical properties of the intermediate layers change when these layers are inscribed. The intensity of the laser beam should be so high that in all cases each recording layer in the multi-layer optically recordable information carrier can be inscribed.

The above citations are hereby incorporated in whole by reference.

It is an object of the invention to provide a method of writing information onto an optically recordable information carrier, which allows the sequence in which the recording layers are inscribed to be selected in an optimum manner.

The method includes a first preparatory step in which the changes of the effective transmission properties of the optically recordable layers before the recording of information on the layers with respect to the effective transmission properties of the optically recordable layers after the recording of information on the layers is determined. The first step is followed by a second preparatory step in which the sequence of recording of the first and the second optically recordable layer is determined. If the changes of the effective transmission properties of the optically recordable layers are known a priori, they can be communicated to the method, for example, by a user or a recording apparatus. The sequence in which the optically recordable layers are inscribed can be determined in an optimum manner, for example, so as to minimize the laser beam intensity required for inscribing these layers. This results inter alia in the heat generation during recording onto the optically recordable information carrier not being unduly large and in the possibility of using a comparatively simple and cheap laser light source.

In a variant of the method the first preparatory step includes the reading of information about the changes of the effective transmission properties of the optically recordable layers from an area on the optically recordable information carrier. Such area contains information about the physical properties of the optically recordable information carrier. If the optically recordable information carrier has an area which contains information about the physical properties of the optically recordable information carrier, such as for example a lead-in area, the method can automatically read this information and derive from this information the changes of the effective transmission properties of the optically recordable layers. The area containing information about the physical properties of the optically recordable information carrier may be provided during the manufacture of the optically recordable information carrier.

In a special variant of the method the first preparatory step includes a first measurement step in which the effective transmission properties of the optically recordable layers before the recording of information on the layers is measured. The first step is followed by a second measurement step in which the effective transmission properties of the optically recordable layers, after the recording of information on the layers is measured is, followed by a comparison step. In the comparison step the measured effective transmission properties of the optically recordable layers before the recording of information on the layers is compared with measured effective transmission properties of the optically recordable layers after the recording of information on the layers. If no information is available about the change of the effective transmission properties of the optically recordable layers during recording onto these layers, this change can be measured in a plurality of measurement steps. For the write operations necessary to carry out these measurement steps it is possible to reserve for example a portion of the optically recordable information carrier.

In a variant of the method the first and the second optically recordable layers are inscribed successively, starting with the optically recordable layer situated farther from the laser light source and ending with the optically recordable layer situated nearer the laser light source if the effective transmission properties of the optically recordable layers after the recording of information on the layers have decreased with respect to the effective transmission properties of the optically recordable layers before the recording of information on the layers. An advantage of writing onto the optically recordable layers in the sequence as defined for the present variant of the method is that the maximum laser beam intensity that is required corresponds to the intensity required for inscribing the optically recordable layer which is farthest from the laser light source while the intermediate layers have not been inscribed and are consequently comparatively transparent. During the recording onto the optically recordable layers the laser beam intensity necessary for inscribing these layers will decrease according as successive layers are written.

In another variant of the method the first and the second optically recordable layer are inscribed successively, starting with the optically recordable layer situated nearer the laser light source and ending with the optically recordable layer situated farther from the laser light source if the effective transmission properties of the optically recordable layers after the recording of information on the layers have increased with respect to the effective transmission properties of the optically recordable layers before the recording of information on the layers. An advantage of inscribing the optically recordable layers in the sequence as defined for the present variant of the method is that the laser beam intensity necessary for inscribing the successive layers will increase to a minimal extent as the successive layers are written.

The recording apparatus is adapted to determine the changes of the effective transmission properties of the optically recordable layers before the recording of information on the layers with respect to the effective transmission properties of the optically recordable layers after the recording of information on the layers, and the recording apparatus is adapted to determine the sequence of recording of the first and the second optically recordable layer.

BRIEF DESCRIPTION OF THE DRAWINGS

These and other aspects of the invention will now be described in more detail with reference to the drawings. In the drawings

DETAILED DESCRIPTION OF THE PREFERRED EMBODIMENT

Figure 1:
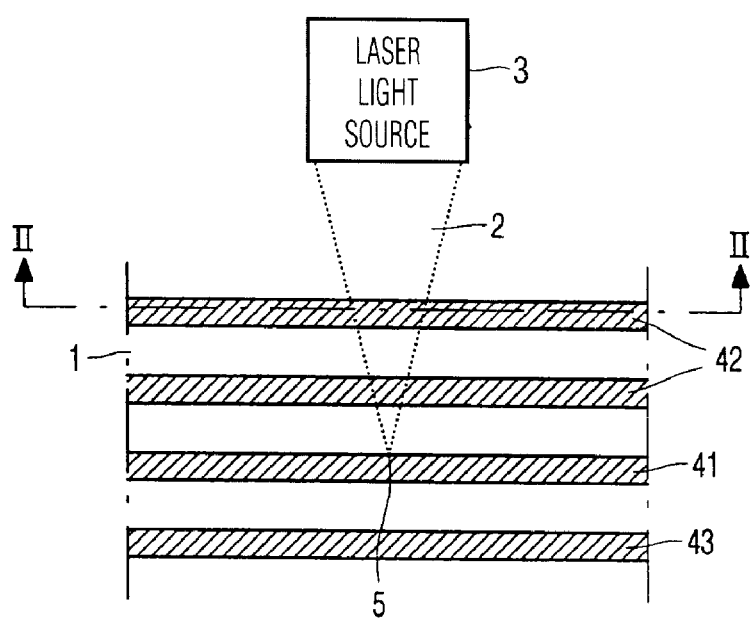
FIG. 1 is a diagrammatic cross-sectional view of a multi-layer optically recordable information carrier of which one layer is being inscribed by a focused laser beam received from a laser light source.

FIG. 1 shows a cross-sectional view of a part of multi-layer optically recordable information carrier 1. A plurality of optically recordable layers 41 through 43 are shown. A laser beam 2 from a laser light source 3 is focused onto the optically recordable layer 41 to be inscribed. An example of a laser light source 3 is a solid-state laser which emits light having a wavelength in the visible part of the spectrum or light having a wavelength in the non-visible part of the spectrum, such as for example, infrared (IR) light and ultraviolet (UV) light. At the location of the focal spot 5 the intensity of the laser beam is such that a mark can be formed in the optically recordable layer 41 to be inscribed. At the location where the laser beam 2 traverses the intermediate layers 42, the diameter of the laser beam is comparatively large, as a result of which the intensity of the laser beam is inadequate to produce a mark in these intermediate layers.

Figure 2:
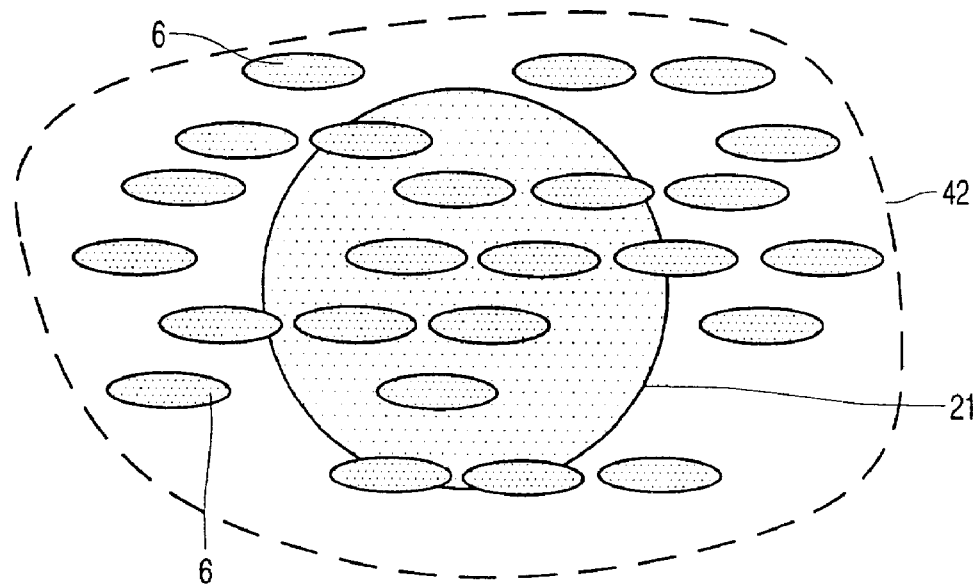
FIG. 2 is a partial plan view of an inscribed intermediate layer exposed to a laser beam.

FIG. 2 is a partial plan view of an intermediate layer 42 in a multi-layer optically recordable information carrier 1 taken on the line II—II in FIG. 1. This intermediate layer 42 has already been inscribed, as a result of which marks 6 are situated on the layer. The intermediate layer 42 is illuminated by the laser beam 2. The portion 21 of the intermediate layer 42 exposed to the laser beam 2 includes both an area with marks 6 and an area without these marks. The transmission coefficient of the intermediate layer 42 at the location of the marks 6 will generally differ from the transmission coefficient of the intermediate layer in an area without these marks. As a result of this, the intermediate layer 42 cannot be characterized by a fixed transmission coefficient. However, the intermediate layer 42 can be characterized by an effective transmission coefficient which is a combination of the transmission coefficient of the intermediate layer at the location of the marks 6 and the transmission coefficient of the intermediate layer in the area without these marks. The value of this effective transmission coefficient depends inter alia on the density of the spatial distribution of the marks 6. If the intermediate layer 42 has not yet been inscribed and, consequently, there are not yet any marks 6 on the layer, the effective transmission coefficient will correspond to the transmission coefficient of the intermediate layer in an area without marks.

The marks 6 in the optically recordable layers 41 through 43 may reflect the laser beam 2 to a greater extent or to a smaller extent than an area without any marks. If the laser beam 2 is reflected to a greater extent by the marks 6, this is referred to inter alia as white writing layers, in which, the effective transmission properties generally decrease after the layers have been inscribed. If the laser beam 2 is reflected to a smaller extent by the marks 6 this is referred to as black writing layers, in which, the effective transmission properties generally increase after the layers have been inscribed.

Figure 3A:
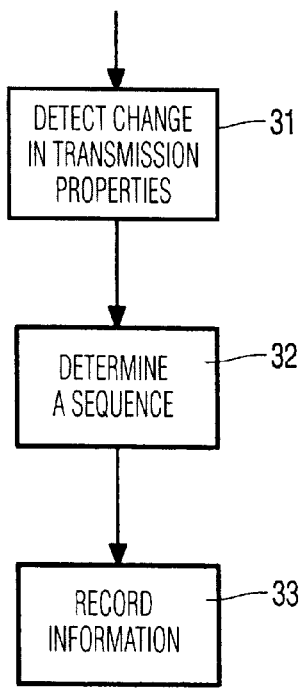
FIGS. 3A and 3B show flow charts of the method in accordance with the invention.

FIG. 3A is a flow chart of an example of a variant of the method in accordance with the invention. The variant comprises three steps 31 through 33. Step 33, in which information is written onto the optically recordable layers 41 through 43, is preceded by a first preparatory step 31, and a second preparatory step 32. In the first preparatory step 31 the changes of the effective transmission properties of the optically recordable layers 41 through 43 before the recording of information on layers with respect to the effective transmission properties of the optically recordable layers after the recording of information on the layers (ΔEff.Trans.) are determined. The determining can be effected inter alia in that information about the changes of the effective transmission properties is entered by a user or by the recording apparatus, or is read from the multi-layer optically recordable information carrier 1 itself, or is determined by a measurement. Subsequently, in a second preparatory step, the information about the changes of the effective transmission properties is used for determining the sequence in which the optically recordable layers 41 through 43 are to be inscribed in the step 33.

Figure 3B:
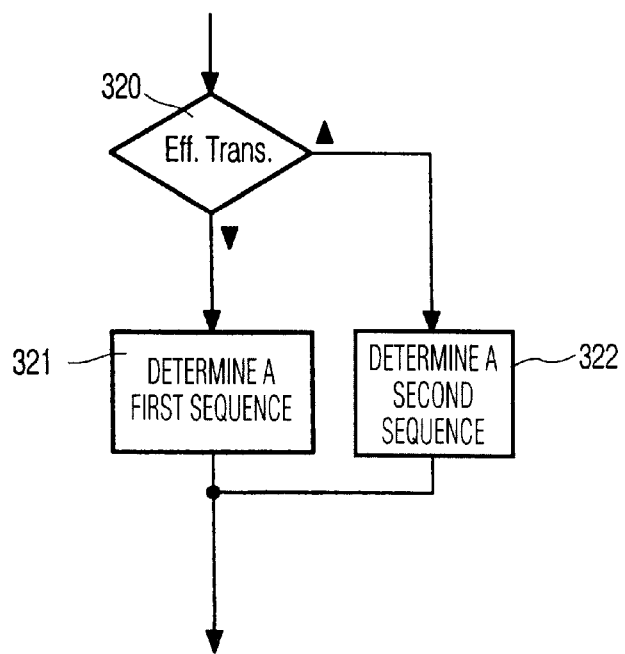

By way of example, the second preparatory step 32 is represented diagrammatically in greater detail in FIG. 3B. In a sub-step 320, a subsequent sub-step 321 or a sub-step 322 is chosen depending on the change of the effective transmission properties. If the effective transmission properties of the optically recordable layers 41 through 42 after information has been written onto the layers have decreased (▼) with respect to the effective transmission properties of the optically recordable layers before information is written onto the layers, the sequence in which the optically recordable layers 41 through 43 are to be inscribed will be determined in the sub-step 321 in such a manner that the layers will be inscribed consecutively starting with the optically recordable layer farthest from the laser light source 3 and ending with the optically recordable layer nearest the laser light source. Conversely, if the effective transmission properties of the optically recordable layers 41 through 42 after information has been written onto the layers have increased (▲) with respect to the effective transmission properties of the optically recordable layers before information is written onto the layers, the sequence in which the optically recordable layers 41 through 43 are to be inscribed will be determined in the sub-step 322 in such a manner that the layers will be inscribed consecutively starting with the optically recordable layer nearest the laser light source 3 and ending with the optically recordable layer farthest from the laser light source. It will be obvious to the expert that there are other alternatives for the step 32. The alternative for the step 32 then depends on the desired result.

Figure 4:
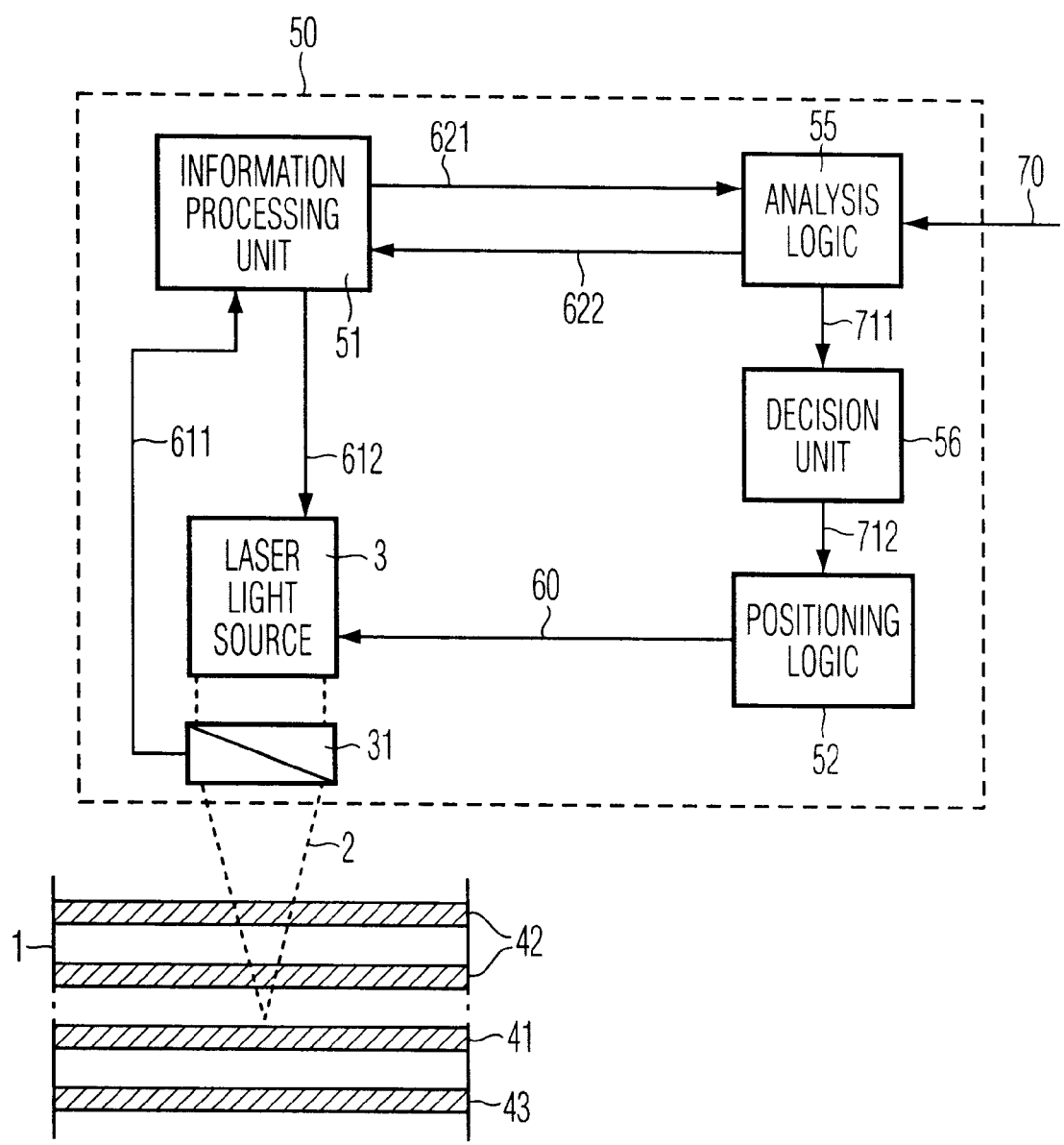
FIG. 4 shows a block diagram of the device in accordance with the invention in the recording apparatus for recording information onto a multi-layer optically recordable information carrier.

FIG. 4 shows a block diagram of a device 50 for recording information on a multi-layer optically recordable information carrier 1. A laser beam 2 from a laser light source 3 is focused onto one of the optically recordable layers 41 through 43. For positioning the focal spot of the laser beam 2 on the optically recordable layer 41 to be inscribed, a unit which comprises a positioning logic 52 applies a control signal 60 to the laser light source 3. When information is recorded onto the optically recordable information carrier 1, an information stream 612 is applied from an information processing unit 51 to the laser light source 3. When information is read from the optically recordable information carrier 1, an information stream 611 is applied from an optical system 31 to the information processing unit 51. The device includes an analysis logic 55 for detecting the changes of the effective transmission properties of the optically recordable layers 41 through 43, before the recording of information on the layers, with respect to the effective transmission properties of the optically recordable layers after the recording of information on the layers. Information about these changes 711 is applied to a decision unit 56. In this decision unit 56, the sequence of recording of optically recordable layers 41 through 43 is determined. Information about the sequence 712, thus determined, is applied to the unit comprising the decision logic 52. The analysis logic 55 can receive external information 70 received from a user or from another device in the recording apparatus, or information 621 which is received from the optically recordable information carrier 1 via the information processing unit 51. While measurements are being carried out, the analysis logic 55 can apply measurement signals 622 to the optically recordable information carrier 1 via the information processing unit 51.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims.

What is claimed is:

1. A method comprising
   first recording information on a first optically recordable layer on an information carrier by exposure to laser light from a first side of the carrier,
   second recording different information on a different second optically recordable layer overlapping the first layer on the carrier, by exposure to the laser light from the first side;
   first determining the changes of the effective transmission properties of the optically recordable layers, before the recording of information on the layers, with respect to the effective transmission properties of the optically recordable layers due to recording of information on the layers;
   second determining the sequence of recording of the first and the second optically recordable layers, said sequence based on the changes of the effective transmission properties of the optically recordable layers.

2. The method of claim 1, in which the first determining includes reading information about the changes of the effective transmission properties of the optically recordable layers from an area on the optically recordable information carrier, which area contains information about the physical properties of the optically recordable information carrier.

3. The method of claim 1, in which the first determining step includes
   first measuring the effective transmission properties of the optically recordable layers before the recording of information on the layers
   second measuring effective transmission properties of the optically recordable layers after the recording of information on the layers; and
   comparing the measured effective transmission properties of the optically recordable layers before the recording of information on the layers with the measured effective transmission properties of the optically recordable layers after the recording of information on the layers.

4. The method of claim 1, in which:
   the effective transmission properties of the optically recordable layers after the recording of information on the layers have decreased with respect to the effective transmission properties of the optically recordable layers before the recording of information on the layers; and
   the first and the second optically recordable layers are inscribed successively, starting with the optically recordable layer situated farther from the laser light source and ending with the optically recordable layer situated nearer the laser light source.

5. The method as claimed in claim 1, in which:

the effective transmission properties of the optically recordable layers after the recording of information on the layers have increased with respect to the effective transmission properties of the optically recordable layers before the recording of information on the layers; and the first and the second optically recordable layers are inscribed successively, starting with the optically recordable layer situated nearer the laser light source and ending with the optically recordable layer situated farther from the laser light source.

6. An information carrier recorded by the method of claim 1.

7. The carrier of claim 6 in which the properties of recorded marks indicate recording information in the first and second layers in a consistent sequence.

8. The carrier of claim 7 in which the recorded marks are inscribed in the first and the second optically recordable layer successively, starting with the optically recordable layer situated farther from the laser light source and ending with the optically recordable layer situated nearer the laser light source.

9. The carrier of claim 7 in which the marks are inscribed in the first and the second optically recordable layers successively, starting with the optically recordable layer situated nearer the laser light source and ending with the optically recordable layer situated farther from the laser light source.

10. A recording apparatus comprising means for recording information on a first optically recordable layer by exposure to laser light from a first side of an information carrier, and to record information on a different second optically recordable layer overlapping the first layer on the carrier, by exposure to laser light from the first side, first means for determining the changes of the effective transmission properties of the optically recordable layers, before the recording of information on the layers, with respect to the effective transmission properties of the optically recordable layers due to the recording of information on the layers; and second means for determining the sequence of recording of the first and the second optically recordable layers, said sequence based on the changes of the effective transmission properties of the optically recordable layers.

11. The apparatus of claim 10, in which the first determining means are adapted for reading information about the changes of the effective transmission properties of the optically recordable layers from an area on the optically recordable information carrier, which area contains information about the physical properties of the optically recordable information carrier.

12. The apparatus of claim 10, in which the first determining means are adapted for:

first measuring the effective transmission properties of the optically recordable layers before the recording of information on the layers;

second measuring effective transmission properties of the optically recordable layers after the recording of information on the layers; and comparing the measured effective transmission properties of the optically recordable layers before the recording of information on the layers with measured effective transmission properties of the optically recordable layers after the recording of information on the layers.

13. The apparatus of claim 10, in which:

the effective transmission properties of the optically recordable layers after the recording of information on the layers have decreased with respect to the effective transmission properties of the optically recordable layers before the recording of information on the layers; and the means to record information is adapted to inscribe the first and the second optically recordable layer successively, starting with the optically recordable layer situated farther from the laser light source and ending with the optically recordable layer situated nearer the laser light source.

14. The apparatus as claimed in claim 10, in which:

the effective transmission properties of the optically recordable layers after the recording of information on the layers have increased with respect to the effective transmission properties of the optically recordable layers before the recording of information on the layers; and the means to record information is adapted to inscribe the first and the second optically recordable layers successively, starting with the optically recordable layer situated nearer the laser light source and ending with the optically recordable layer situated farther from the laser light source.

15. Apparatus for programming a recording apparatus comprising:

apparatus to provide means for recording information on a first optically recordable layer by exposure to laser light from a first side of an information carrier, and to record information on a different second optically recordable layer overlapping the first layer on the carrier, by exposure to laser light from the first side;

apparatus to provide first means for determining the changes of the effective transmission properties of the optically recordable layers, before the recording of information on the layers, with respect to the effective transmission properties of the optically recordable layers due to the recording of information on the layers; and apparatus to provide second means for determining the sequence of recording of the first and the second optically recordable layers, said sequence based on the changes of the effective transmission properties of the optically recordable layers.

16. The apparatus of claim 15 consisting essentially of programmed computer media.

* * * * *